July 12, 1966   A. WINKLER ETAL   3,260,183
CAMERA WITH FILM BLOCKING DEVICE
Filed May 5, 1964
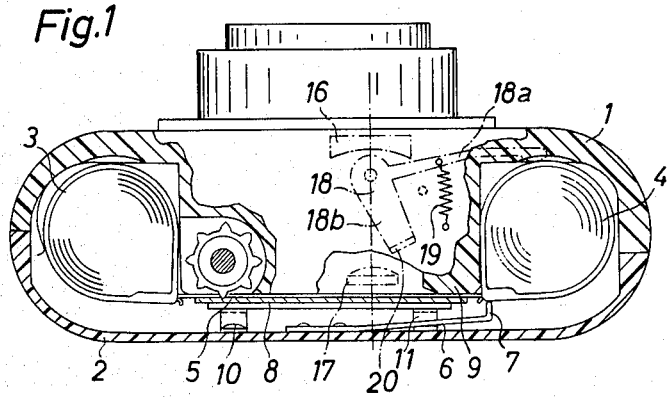
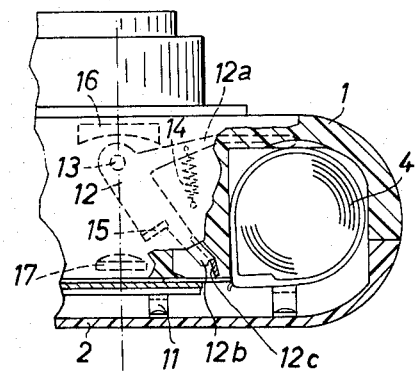
INVENTOR.
ALFRED WINKLER
DIETER ENGELSMANN
ROLF SCHRÖDER
SIEGFRIED ZOBEL
BY Michael J. Striker United States Patent Office 3,260,183
Patented July 12, 1966

3,260,183
CAMERA WITH FILM BLOCKING DEVICE
Alfred Winkler, Munich, Dieter Engelsmann, Unterhaching, Munich, and Rolf Schröder and Siegfried Zobel, Munich, Germany, assignors to Agfa Aktiengesellschaft, Leverkusen, Germany
Filed May 5, 1964, Ser. No. 364,944
Claims priority, application Germany, Oct. 1, 1963, A 44,185
8 Claims. (Cl. 95—31)

The present invention relates to cameras.

More particularly, the present invention relates to cameras provided with a space which is adapted to receive a take-up cartridge for receiving exposed film.

Thus, the type of camera to which the present invention relates is adapted to accommodate a take-up cartridge of the type in which film can be coiled without being connected to a rotary spool, and such a cartridge when properly positioned in the camera will have a mouth through which exposed film automatically enters into the cartridge to be coiled therein. Cameras of this type are considered highly advantageous because the lack of any rotary film spools provides an exceedingly simple construction and also permits an exceedingly simple and convenient operation of the camera inasmuch as it is only necessary to place cartridges in the camera and the film is automatically guided without having to be attached by the operator to the spindle of a take-up spool, for example. Furthermore, with such cameras rewinding of the exposed film becomes unnecessary. With cameras where the ends of the film strip are attached to spools there is always the possibility that through improper operation of the camera an end of the film strip will be pulled away from the supply spool, and if this type of improper operation is not noticed by the operator it can happen that when the camera is opened the exposed film will be rendered useless, and even if the operator does notice that the end of the film has been pulled away from the supply spool it becomes necessary to open the camera in a dark room to prevent improper exposure of the film.

It has therefore become of considerable advantage to use film cartridges which can simply have the film strip coiled therein without requiring the use of any spools, but in this case it is of course essential to prevent the operator from forgetting to introduce into the camera a take-up cartridge for receiving the exposed film. For this purpose, as long as such a take-up cartridge is not properly positioned in the camera it has already been proposed to provide structures which will prevent operation of the camera as by blocking the operation of the film-transporting structure, this blocking structure being released only when a take-up cartridge is properly positioned in the camera.

The great disadvantage of this type of construction is that the film transporting structure cannot be operated unless a take-up cartridge is in the camera, so that checking of the operation of the camera without film therein is not possible. Very often the shutter actuating structure is combined with the film transporting structure, so that when there is no take-up cartridge in the camera it is not possible to check the operation of the shutter. Furthermore, because of the presence of a blocking element in the transmission between the moving elements of the film-transporting and shutter operating structures, injury to these structures due to forceful attempts to operate them when they are blocked is also likely.

It is accordingly a primary object of the present invention to provide a camera of the above type which includes a take-up cartridge receiving exposed film which is simply coiled into the cartridge without being connected to a take-up spool, but which will avoid the above drawbacks by reliably blocking movement of film to the take-up cartridge, or to the space normally occupied thereby, in the event that a take-up cartridge is not properly positioned in said space, while at the same time making it possible to actuate the film-transporting and shutter operating structure at any time, even when the camera does not have any film therein.

A further object of the present invention is to provide a structure which will cooperate only with the film itself and not with any other structure of the camera to prevent movement of the film to the space which is adapted to accommodate a take-up cartridge in order to prevent movement of film to the space when a cartridge is not properly positioned therein.

In addition, it is an object of the present invention to provide a structure which will warn the operator that there is no take-up cartridge properly positioned in the spaced provided by the take-up cartridge, so that not only will it be possible with the invention to block movement of film to the take-up cartridge space when there is no take-up cartridge in the latter space but also with the structure of the invention the operator will be given a positive indication of the fact that there is no take-up cartridge in the camera.

Yet another object of the present invention is to provide a warning structure of this type which will visibly indicate to the operator that it is necessary to place a take-up cartridge in the camera.

The object of the present invention also includes the provision of a structure of the above type which is exceedingly simple and reliable in operation while at the same time occupying only a small amount of space so that the structure of the invention can be incorporated without difficulty into a camera.

With these objects in view the invention includes, in a camera, a camera housing which has in its interior a space which is adapted to be occupied by a take-up cartridge for receiving exposed film. The camera includes a guide means which guides film along a predetermined path to this latter space to be received in a take-up cartridge when the space is occupied thereby, and the camera housing also carries a blocking means which has a blocking position extended across the path of film movement to the latter space where it is to prevent the film from moving to this space when the blocking means is in its blocking position. In accordance with the present invention the take-up cartridge itself engages the blocking means to displace the latter to a non-blocking position when the take-up cartridge is properly positioned in the above space, so that in this way blocking of the film from movement to the space normally occupied by a take-up cartridge is automatically prevented as long as there is no take-up cartridge properly positioned in the interior of the camera housing.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a partly sectional, schematic top plan view of a camera provided with one possible embodiment of a structure according to the present invention; and FIG. 2 is a fragmentary partly sectional plan view from another embodiment of a structure according to the present invention.

Referring now to the drawings and to FIG. 1 in particular, there is shown therein a camera housing 1 which includes a rear cover 2 capable of being moved to and from the closed position illustrated in FIG. 1 where the cover 2 closes the camera housing. A film cartridge 3, which contains unexposed film, is introduced into a cartridge chamber situated at the left of the camera, as viewed in FIG. 1, before the camera is closed, and this cartridge is preferably of the type in which film is simply coiled without being carried by a rotary film spool so that the film can simply be withdrawn from its coils within the interior of the supply cartridge 3. The take-up cartridge 4 is shown in FIG. 1 accommodated in a space in the interior of the camera housing 1 which is provided for the purpose of receiving the take-up cartridge 4. The exposed film simply moves through the mouth of the cartridge 4 into the latter to be automatically coiled therein, and this take-up cartridge 4 also does not have any rotary film spools, so that with this type of camera an exceedingly simple structure requiring no rotary film spools and all of the components associated therewith is provided, and of course it will be noted that also no rewinding of the exposed film is required with such a construction.

The camera housing 1 includes in its interior a guide means for guiding the film along a predetermined path from the supply cartridge 3 to the take-up cartridge 4, and this guide means includes a conventional pressure plate 8 carried by springy members 10 and 11 which are fixed to the cover 2 at the inner surface thereof, so that when the cover 2 is in its closed position shown in FIG. 1 the pressure plate 8 will be urged forwardly toward a rearwardly directed surface in the interior of the housing against which the film is situated so as to be positioned in the focal plane, as is well known in the art. Thus, this latter rearwardly directed surface in the interior of the housing together with the pressure plate 8 form a guide means which guides the film 5 for movement along a predetermined path extending from the supply cartridge 3 to the take-up cartridge 4, and FIG. 1 diagrammatically illustrates a rotary sprocket roller having sprockets which are adapted to enter into the film perforations so as to advance the film from the supply cartridge to the take-up cartridge. Once the leading end of the film has the teeth of the sprocket roller situated in its perforations, the camera can be closed and the film will automatically be guided by the pressure plate and the surface which locates the film in the focal plane along a predetermined path directly into the mouth of the take-up cartridge 4, assuming of course that the empty take-up cartridge has been properly positioned in the housing 1 in the space in the interior thereof which is provided for the take-up cartridge 4.

It will sometimes happen, particularly with amateurs or careless operators, that by forgetfulness the operator of the camera will neglect to place a take-up cartridge 4 in the camera space which is adapted to receive the same, or it may also happen that if the take-up cartridge is placed in the camera it is improperly positioned therein, and in accordance with the present invention a structure is provided to prevent movement of the film into the space provided for the take-up cartridge 4 in the event that a take-up cartridge does not occupy this space or is improperly positioned therein. This structure for preventing movement of the film to the space which should be occupied by the cartridge 4 is, according to the invention, in the form of a blocking means which has a blocking position extending into the path of movement of the film from the supply cartridge toward the space which should be occupied properly by the cartridge 4, and in accordance with the invention this blocking means in the event that a cartridge 4 is properly positioned in the space provided therefor will be automatically displaced to a non-blocking position provided unobstructed movement of the film to the take-up cartridge.

In the embodiment of FIG. 1 the blocking means takes the form of an elongated leaf spring 6 which is fixed at its left end, as viewed in FIG. 1, to the inner surface of the cover 2 and which has at its right end, as viewed in FIG. 1, a free end portion 7 which forms the blocking portion of the blocking means and which will extend into the path of movement of the film toward the space which should be occupied by the cartridge 4 in the event that a cartridge 4 either is not in this space or is improperly positioned therein. Thus, as may be appreciated from FIG. 1 in the event that a cartridge 4 is not located in the space provided therefor in the interior of the camera housing the blocking spring 6 will due to its own inherent resiliency be displaced forwardly beyond the position shown in FIG. 1 so that the blocking end portion 7 will be located across the path of movement of the film and will engage the leading end of the film to block further movement thereof into the space which should be occupied by the cartridge 4. Thus, if there should be no film cartridge 4 in the interior of the camera or if it is improperly positioned therein, the operator can actuate the sprocket roller to advance the film from the supply cartridge 3, and the film will be guided toward the space which should be occupied by the cartridge 4 by the guide means which is formed by the pressure plate 8 and the wall 9 which has the rear surface which locates the film in the focal plane, as pointed out above, and by way of this guide means 8, 9 the leading end of the film will approach the space which normally should be occupied by the cartridge 4 in the manner illustrated in FIG. 1. If the cartridge 4 is not in this space or is improperly positioned therein, the blocking end 7 of the spring 6 will extend across the path of movement of the film to be engaged by the leading end thereof, thus blocking further movement of the film, and in this way further advancing of the film is reliably averted when the operator forgets to insert a take-up cartridge 4 or has improperly positioned the latter.

If, however, a take-up cartridge 4 has been properly positioned in the interior of the camera in the space provided therefor, then when the operator displaces the cover 2 into the closed position thereof illustrated in FIG. 1, the blocking portion 7 of the blocking means 6 will engage the exterior surface of the cartridge 4 to be displaced by the latter to the non-blocking position illustrated in FIG. 1 where the blocking portion 7, and the remainder of the spring 6, are displaced away from the path of movement of the film so that in this way the blocking means will provide an unobstructed movement of the film to the take-up cartridge 4.

It is to be noted that this construction of the invention is exceedingly simple since it requires only the addition of a single leaf spring 6 to the conventional structure of the camera. Furthermore, it is to be noted that as long as the cover 2 is not in its closed position shown in FIG. 1 the leaf spring 6 is displaced with the cover 2 away from all the other elements carried by the camera housing so that there is no problem in checking the operation of the camera when there is no film in it and when the cover 2 is removed from the camera or displaced to its open position, in the event that the cover 2 is, for example, hinged at one end to an end of the camera housing. However, even if the cover 2 is closed it will be noted that the free end 7 of the spring 6 does not project into any of the moving parts of the camera, so that even in this case it is perfectly possible to operate the camera without any film therein.

The embodiment of the invention which is illustrated in FIG. 2 also includes a blocking means which is carried by the camera housing for movement between a blocking position located in the path of film movement and a non-blocking position displaced from the path of film movement, and in the embodiment of FIG. 2 this blocking means takes the form of a blocking lever 12 which is fixedly carried by a shaft or pin 13 which is supported for turning movement by any suitable bearings in the interior of the camera. A spring 14 is connected at one end to a stationary part of the camera housing and at its opposite end to the arm 12a of the lever 12 so as to urge the latter in a clockwise direction, as viewed in FIG. 2, to a blocking position where the arm 12b of the blocking lever 12 extends at its free end 12c across the path of film movement, the wall 9 in this case being provided with a suitable opening through which the free end 12c of the blocking arm 12b can extend across the path of film movement toward the space which is to be occupied by the take-up cartridge 4. The interior structure of the camera also provides an opening through which the arm 12a can extend into the space normally occupied by the cartridge 4 in case that there is no cartridge in this space, so that when a cartridge 4 is properly positioned in this latter space the exterior surface of the cartridge 4 in this case will displace the lever 12 in opposition to the spring 14 in a counterclockwise direction, as viewed in FIG. 2, by engagement with the arm 12a which is displaced forwardly upon introduction of the cartridge 4 into the camera, so that the blocking arm 12b will be retracted to a non-blocking position displaced from the path of movement of the film toward the space which is occupied by the cartridge 4. Thus, when there is no cartridge 4 in the interior of the camera, or if it is improperly positioned in the camera, the spring 14 will automatically position the blocking lever 12 in a blocking position where its arm 12b extends across the path of film movement to engage the leading end of the film to block further movement thereof, as was described above in connection with FIG. 1.

The structure of the invention also includes a warning means for warning the operator that there is no take-up cartridge in the camera, or that it is improperly positioned therein, and in the embodiment of FIG. 2 this warning means takes the form of a warning member 15 which is constituted by a portion of the lever 12 which is bent upwardly from the remainder thereof and which may be suitably colored, for example, so as to provide a warning indication. This warning member 15, formed by an upwardly directed lug fixed to the lever 12 and preferably integral therewith, is at such an elevation that it will extend across the optical axis of the viewfinder when there is no take-up cartridge 4 in the interior of the camera. The viewfinder, as is diagrammatically shown in FIG. 2, includes the front and rear finder lenses 16 and 17, respectively, and when there is no cartridge 4 in the interior of the camera the spring 14 will not only displace the lever 12 to its blocking position where the blocking portion 12b extends across the path of film movement, but in addition the warning member 15 will be positioned at the same time across the optical axis of the viewfinder 16, 17 so that when the operator looks into the viewfinder he will immediately notice the presence of the warning member 15 and will thus know that the camera should be provided with a take-up cartridge in its interior or that the take-up cartridge should be properly positioned within the camera.

It is not absolutely essential to physically connect the warning means to the blocking means for movement therewith, and FIG. 1 shows an embodiment where the warning means is formed by a lever 18 similar to the lever 12 except that the lever 18 does not have any blocking portion. A spring 19 which corresponds to the spring 14 of FIG. 2 urges the lever 18 in a clockwise direction, and the lever 18 has an arm 18a which will extend into the space which otherwise is occupied by the take-up cartridge 4. The arm 18b of the lever 18 has an upwardly directed free end portion 20 which forms a warning member which is adapted to extend across the optical axis of the viewfinder 16, 17 which may have the same structure as the viewfinder of FIG. 2. Thus, in this case when there is no cartridge 4 in the camera or when the cartridge is improperly positioned therein the spring 19 will have displaced the lever 18 in a clockwise direction from the position shown in FIG. 1 to a warning position where the arm 18a extends into the space which should be occupied by the cartridge 4 and where the warning member 20 extends across the optical axis of the viewfinder to be visible to the operator. However, if a cartridge 4 is properly positioned in the interior of the camera housing 1 of FIG. 1, the exterior surface of the cartridge will position the lever 18 in opposition to the spring 19 in the location shown in FIG. 1 where the warning member 20 is displaced from the optical axis of the viewfinder to an extent sufficient to prevent the operator from seeing the warning member 20.

Of course, the invention is not limited to the details described above. In particular, the blocking means may have constructions different from those described above.

It will be understood that each of the elements described above, or two or more together, may also find a useful application in other types of cameras differing from the types described above.

While the invention has been illustrated and described as embodied in cameras with take-up cartridges, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, a camera housing having in its interior a space which is adapted to receive a take-up cartridge for receiving exposed film when said cartridge occupies said space; guide means carried by said camera housing for guiding film along a predetermined path to said space to be received in a take-up cartridge when said space is occupied thereby; and blocking means carried by said camera housing for movement between a blocking position extending into said path for blocking movement of film therealong to said space and a non-blocking position displaced from said path to provide unobstructed movement of film along said path to said space, said blocking means engaging a cartridge when the latter is properly positioned into said housing in said space thereof to be held by said cartridge in said non-blocking position, and said blocking means automatically assuming said blocking position thereof when said space is not properly occupied by a take-up cartridge, whereby if said space is not properly occupied by a take-up cartridge movement of film to said space will be blocked by said blocking means.

2. In a camera, in combination, a camera housing having a removable cover for opening and closing said housing and said housing having in its interior a space which is adapted to be occupied by a take-up cartridge for receiving exposed film; guide means carried by said camera housing for guiding film along a predetermined path to said space to be received in a take-up cartridge when the latter occupies said space; and an elongated springy member carried by said cover and having a free end portion extending into said path when said cover closes said housing and said space is not properly occupied by the take-up cartridge, so that said free end portion of said springy member will then have a blocking position blocking movement of film to said space, said free end portion of said springy member, when said cover closes said housing, engaging an exterior surface of a film cartridge properly positioned in said space to be held by the cartridge itself in a non-blocking position displaced from said path.

3. In a camera, in combination, a camera housing having in its interior a space which is adapted to be occupied by a take-up cartridge for receiving exposed film; guide means carried by said camera housing for guiding the film along a predetermined path to said space to be received in a take-up cartridge which properly occupies said space; a blocking lever turnably carried by said camera housing for movement between a blocking position where a blocking portion of said lever extends across said path to prevent movement of film therealong to said space and a non-blocking position where said blocking portion of said lever is displaced from said path to provide an unobstructed movement of film along said path to said space, said lever having a second portion which in the blocking position of said lever extends into said space to be engaged by a take-up cartridge when the latter is introduced into and properly positioned in said space, the take-up cartridge itself when first introduced into said space acting on said second portion of said blocking lever to displace the latter to said non-blocking position, so that when the take-up cartridge is properly positioned in said space said blocking lever will have its non-blocking position providing unobstructed movement of film along said path to a take-up cartridge in said space.

4. In a camera as recited in claim 3, spring means operatively connected to said blocking lever for urging the latter to said blocking position thereof.

5. In a camera, in combination, a camera housing having in its interior a space which is adapted to be occupied by a take-up cartridge for receiving exposed film; guide means carried by said camera housing for guiding film along a predetermined path to said space to be received in a take-up cartridge when said space is occupied thereby; blocking means carried by said camera housing for movement between a blocking position extending into said path to block movement of film to said space and a non-blocking position displaced from said path to provide unobstructed movement of film to said space, said blocking means responding automatically to presence of a take-up cartridge in said space to be displaced from said blocking to said non-blocking position so that said blocking means assumes said blocking position thereof only when a cartridge is not properly positioned in said space; and warning means located in said camera housing for warning the operator that said space is not occupied by a take-up cartridge, said warning means having a warning position warning the operator that said space is not occupied by a take-up cartridge and a non-warning position providing no warning to the operator, said warning means also responding automatically to location of a take-up cartridge in said space to be placed automatically in said non-warning position, so that when a take-up cartridge does not occupy said space movement of film to said space is blocked and indication of the fact that said space is unoccupied by a take-up cartridge is given to the operator by said warning means.

6. In a camera as recited in claim 5, viewfinder means carried by said camera housing, said warning means when in said warning position thereof being visible in said viewfinder means.

7. In a camera, in combination, a camera housing having in its interior a space which is adapted to be occupied by a take-up cartridge for receiving exposed film; guide means carrier by said camera housing for guiding film along a predetermined path to said space to be received in a take-up cartridge located in said space; a springy blocking member having a blocking position where a free end portion thereof extends into said path of movement of film to said cartridge to block with said free end portion thereof movement of film to said space, said free end portion being engaged by an exterior surface of a film cartridge properly positioned in said space to be held by the cartridge itself in a non-blocking position displaced from said path to permit unobstructed movement of film to said space; a warning lever carrying a warning portion and having an arm which extends into said space when the latter is unoccupied by a take-up cartridge, said arm being displaced by a cartridge in said space out of said space to place said warning portion in a position where it is not visible to the operator; viewfinder means; and spring means urging said lever to a position where said warning portion thereof is visible in said viewfinder means when said arm of said lever extends into said space, whereby when a take-up cartridge properly occupies said space said warning portion is not visible in said viewfinder means and said springy blocking member has its free end portion displaced from said path.

8. In a camera, in combination, a camera housing having in its interior a space which is adapted to receive a take-up cartridge for receiving exposed film; guide means carried by said camera housing for guiding film along a predetermined path to said space to be received in a take-up cartridge when said space is occupied thereby; a blocking lever turnably carried by said camera housing and having a blocking portion located in said path to block movement of film along said path to said space; spring means urging said lever to a blocking position where said blocking portion is located in said path, said lever having an arm extending into said space when the latter is unoccupied by a take-up cartridge and a cartridge when properly positioned in said space displacing said arm to a position which places said lever in opposition to said spring means in a non-blocking position where said blocking portion of said lever is displaced from said path to provide unobstructed movement of film along said path to a take-up cartridge in said space; viewfinder means; and a warning member carried by said lever and located in said viewfinder means to be visible therein only when said arm of said lever extends into said space, so that said warning member when seen in said viewfinder indicates to the operator that said space is unoccupied by a cartridge, the cartridge when in said space, placing said blocking lever in said non-blocking position and also placing said warning member in a position where it is not visible in said viewfinder means.

References Cited by the Examiner
UNITED STATES PATENTS

| 2,206,032 | 7/1940 | Foster | 352—76 |
| 2,661,162 | 12/1953 | Owens | 242—71.2 X |
| 2,766,669 | 10/1956 | Weisse et al. | 95—31 |

NORTON ANSHER, *Primary Examiner.*